(12) United States Patent
Whitley (10) Patent No.: US 8,919,783 B2
(45) Date of Patent: Dec. 30, 2014

(54) CAM LOCK COUPLING GASKET

(71) Applicant: Parker-Hannifin Corporation, Cleveland, OH (US)

(72) Inventor: James Whitley, Richmond, VA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/751,684

(22) Filed: Jan. 28, 2013

(65) Prior Publication Data

US 2013/0193652 A1 Aug. 1, 2013

Related U.S. Application Data

(60) Provisional application No. 61/591,523, filed on Jan. 27, 2012, provisional application No. 61/674,569, filed on Jul. 23, 2012.

(51) Int. Cl.
| | |
|---|---|
| *F16J 15/06* | (2006.01) |
| *F16L 21/04* | (2006.01) |
| *F16L 37/18* | (2006.01) |

(52) U.S. Cl.
CPC ........ *F16L 21/04* (2013.01); *F16L 37/18* (2013.01)
USPC .......................................... 277/626; 277/608

(58) Field of Classification Search
USPC .......... 277/602, 608, 626, 627, 628, 644, 650
See application file for complete search history.

(56) References Cited

U.S. PATENT DOCUMENTS

| | | | |
|---|---|---|---|
| 2009/0179388 A1* | 7/2009 | Uhlenkamp et al. | 277/608 |
| 2011/0140374 A1* | 6/2011 | Dubiel | 277/628 |
| 2012/0205877 A1* | 8/2012 | Schumacher et al. | 277/600 |

* cited by examiner

*Primary Examiner* — Gilbert Lee
(74) *Attorney, Agent, or Firm* — Renner, Otto, Boisselle & Sklar, LLP (57) ABSTRACT

A cam lock quick coupling 10 includes coupling components 12 and 13. A gasket 47, 147, 247 for use in the coupling 10 includes a positioning portion 67, 167, 267 substantially adjacent an outer peripheral surface 50, 150, 250; a compression sealing portion 68, 168, 268 substantially adjacent an inner peripheral surface 49, 149, 249; and a connecting portion 69, 169, 269 closer to the outer peripheral surface than to the inner peripheral surface.

9 Claims, 8 Drawing Sheets

CAM LOCK COUPLING GASKET

CROSS REFERENCE TO RELATED APPLICATIONS

The present application claims the benefit of the filing date of U.S. Provisional Patent Application Ser. No. 61/674,569 filed Jul. 23, 2012 and U.S. Provisional Patent Application Ser. No. 61/591,523 filed Jan. 27, 2012, the disclosure of which is incorporated herein by reference in its entirety.

TECHNICAL FIELD

This invention relates to an elastomeric gasket for sealing against fluid leakage between mating components. More specifically, this invention relates to such a gasket that retains its sealing integrity even after multiple connections and disconnections of the mating components.

BACKGROUND OF THE INVENTION

Elastomeric gaskets are widely used between mating components to seal against fluid leakage when the components are connected together. One application for such gaskets is with quick coupling components. Quick coupling components provide two mating generally tubular components that are easily and quickly connected or disconnected without requiring tools or time consuming threaded connections. One type of quick coupling is a cam lock quick coupling, which uses cams operated by levers to quickly and easily lock and unlock the coupling components, such as shown in U.S. Pat. No. 4,295,670.

Gaskets used in cam lock quick couplings seal between the two coupling components to prevent fluid leakage when the components are coupled together. Gaskets of this type generally provide a rectangular cross sectional configuration commonly known as a square cut gasket, such as also shown in the above referenced patent. In the use of gaskets for cam lock couplings, the axial compression force available to compress the gasket between the coupling components is limited by the force that can be conveniently provided by manual operation of the cam levers. Further, when cam lock quick couplings are to be repeatedly connected and disconnected, it is desirable for the gasket to maintain its sealing integrity and prevent leakage for a relatively larger number of connect and disconnect sequences.

SUMMARY OF THE INVENTION

The present invention provides an elastomeric gasket for sealing between mating components. When used with mating cam lock quick coupling components, the gasket according to the present invention accommodates asymmetrical longitudinal deformation and increases seal compression stress and seal life during repeated connection and disconnection sequences.

More specifically, the gasket according to the present invention is of a compressible elastomeric material and has a generally annular shape with a longitudinal axis. A radially inwardly facing inner peripheral surface and a radially outwardly facing outer peripheral surface are separated by longitudinally oppositely facing lateral surfaces. A positioning portion of the gasket is substantially adjacent the outer peripheral surface, a compression sealing portion is substantially adjacent the inner peripheral surface, and a connecting portion is intermediate the positioning portion and the compression sealing portion. The connecting portion has a longitudinal thickness substantially less than the longitudinal thickness of the compression sealing portion, and the connecting portion may be closer to the outer peripheral surface than to the inner peripheral surface.

The lateral extent of the gasket may have four quartile regions of substantially equal radial extent. The first quartile region may be adjacent the outer peripheral surface, the second quartile region may be adjacent and radially inward relative to the first quartile region, the third quartile region may be adjacent and radially inward relative to the second quartile region, and the fourth quartile region may be adjacent and radially inward relative to the third quartile region. The positioning portion may be disposed substantially within the first quartile region, and the sealing compression portion may be disposed substantially within the third and fourth quartile regions. The connecting portion may be disposed substantially within the second quartile region.

At least one of the lateral surfaces of the compression sealing portion may include two outwardly facing crests separated by an outwardly facing groove, and preferably both of the lateral surfaces of the compression sealing portion may include two outwardly facing crests separated by an outwardly facing groove. The entire lateral extent of the lateral surfaces may be substantially mirror images of one another. The connecting portion may be disposed substantially within the second quartile region, and the longitudinal thickness of the connecting portion may be no greater than about half the longitudinal thickness of the positioning portion and the compression sealing portion.

The gasket has a relaxed configuration and a fully compressed configuration, and the gasket has a laterally extending centerline in the relaxed configuration. The first lateral surface of the compression sealing portion may be closer to the centerline in the compressed configuration than in the relaxed configuration, and the second lateral surface of the compression sealing portion may be substantially the same distance from the centerline in both the compressed configuration and the relaxed configuration.

The gasket may be in combination with mating first and second cam lock quick coupling components, with the first and second coupling components each having a generally flat coupling component sealing surface. The coupling component sealing surfaces are longitudinally aligned with the gasket compression sealing portion.

The invention further provides various ones of the features and structures described above and in the claims set out below, alone and in combination, and the claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
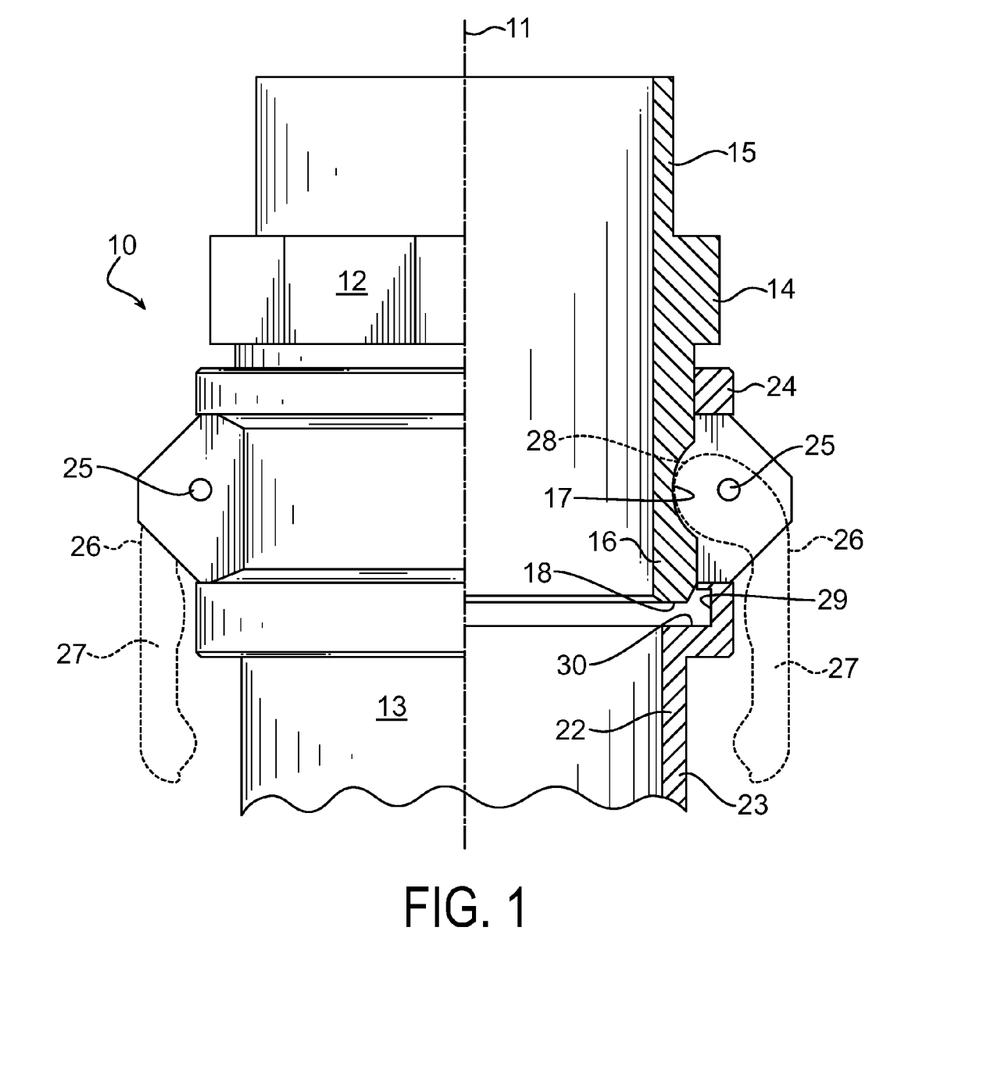
FIG. 1 illustrates a prior art cam lock quick coupling in a locked configuration, with one half of the coupling shown in elevation and the other half of the coupling shown in cross section, and with no gasket in the coupling.

Referring now to the drawings in greater detail, FIG. 1 illustrates a conventional prior art cam lock quick coupling 10. The quick coupling 10 has a longitudinal axis 11 and includes first and second coupling components 12 and 13. The coupling components 12 and 13 may be of any suitable material, such as for example metal or plastic selected in a known manner based upon the fluids, temperatures, pressures, and other parameters of the system in which the coupling 10 is to be used.

The coupling component 12 includes a generally cylindrical body 14 having longitudinally spaced ends 15 and 16. The end 15 may be connected to a fluid component such as, for example, a hydraulic hose (not shown) through which hydraulic fluid flows in a hydraulic system. The end 16 is arranged for connection to and disconnection from the coupling component 13. The end 16 includes an annular cam surface 17. The end 16 also includes a generally flat lateral sealing surface 18 that seals against a gasket (not shown in FIG. 1) as further described below.

The coupling component 13 includes a generally cylindrical metal body 22 that is coaxial with coupling component 11 and that has longitudinally spaced ends 23 and 24. The end 23 may be connected to a fluid component (not shown) such as, for example, a hydraulic pump or motor or valve that is to be connected to the coupling component 11 in a hydraulic system to receive and/or return hydraulic fluid in a known manner. The end 24 includes radially opposite pivot connections 25 to which cam levers 26 (shown in phantom outline in FIG. 1) are rotatably connected for rotational movement relative to the body 22. The cam levers 26 each include a cam lever arm 27 that is operated or rotated manually between a released position (not shown) and a connected or locked position illustrated in FIG. 1. The cam levers 26 further include a cam surface 28. In the connected or locked position illustrated in FIG. 1, the cam surfaces 28 engage and lock against the corresponding annular cam surface 17 of the coupling component 12. When the coupling components 12 and 13 are to be released and separated, the cam levers 26 are rotated from the positions illustrated in FIG. 1 about pivot connections 25 to disengage the cam surfaces 28 from the cam surface 17. In the released position, the coupling component 12 may be moved longitudinally by the operator away from the coupling component 13 in a known manner.

The coupling component 13 at its end 24 further includes an annular recess or radially inwardly facing groove 29 in which a gasket (not shown in FIG. 1) is retained as described further below. An annular longitudinally facing sealing surface 30 is provided by one wall of the groove 29, and the gasket described below rests in the groove 29 adjacent the sealing surface 30. When the coupling components 12 and 13 are in the connected or locked position illustrated in FIG. 1, the sealing surfaces 18 and 30 compress the gasket to prevent fluid leakage between the coupling components 12 and 13 as further described below.

Figure 2:
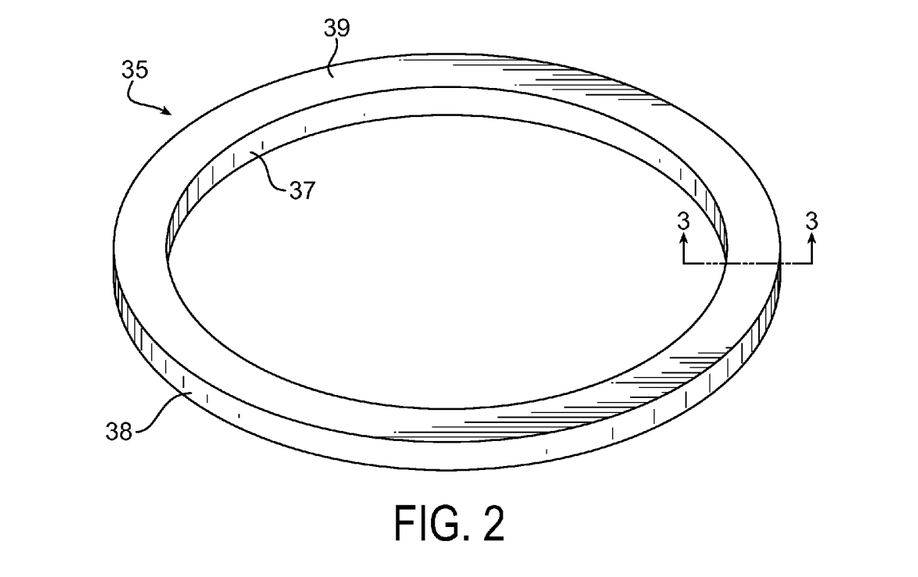
FIG. 2 is a perspective view of a prior art gasket for use with the coupling shown in FIG. 1, with the gasket shown in a relaxed configuration.
Figure 3:
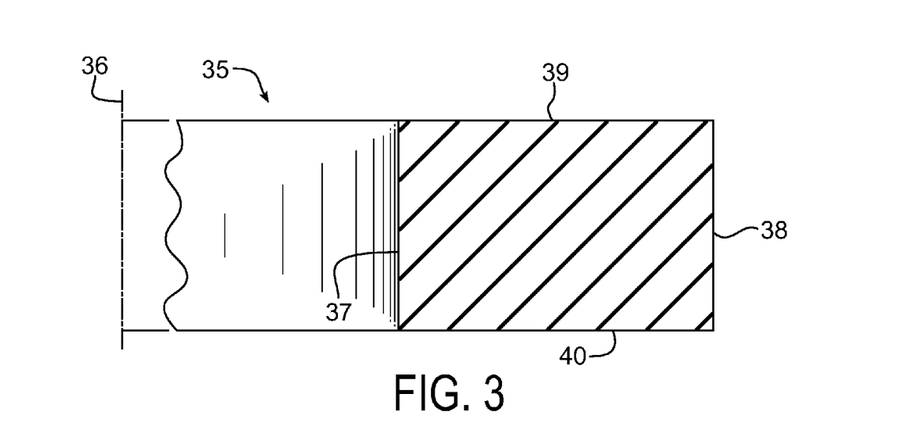
FIG. 3 is a cross sectional view of the gasket shown in FIG. 2, taken along reference view line 3-3.
Figure 4:
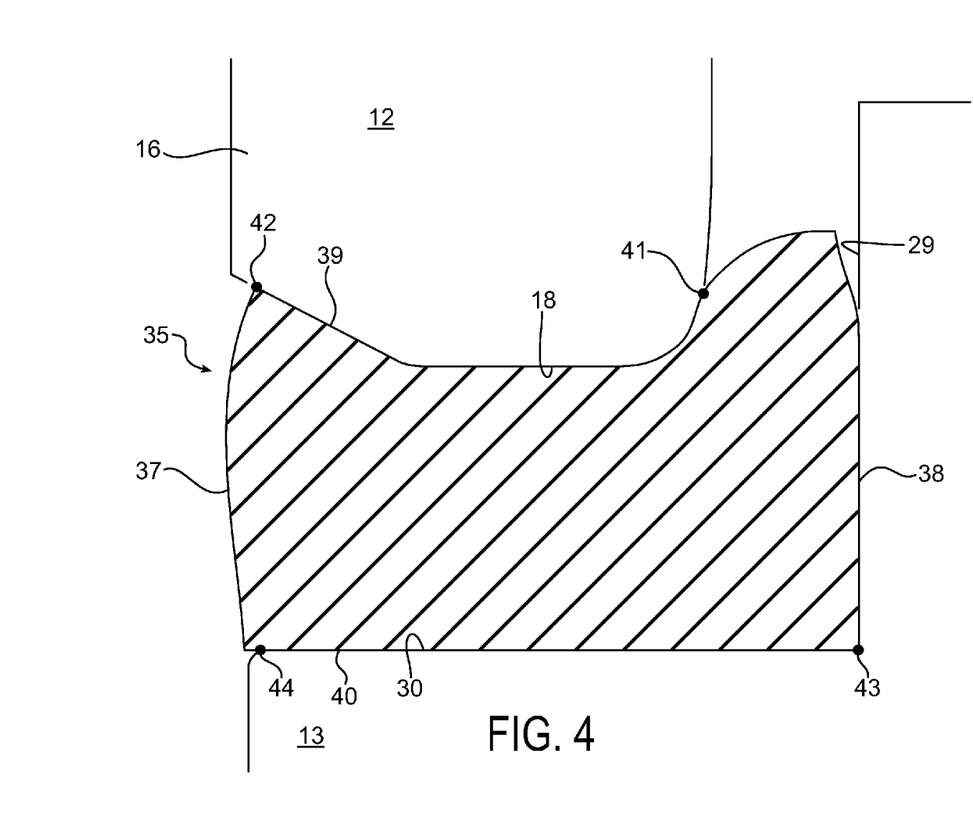
FIG. 4 is a cross sectional view of a portion of the cam lock quick coupling shown in FIG. 1, with the gasket shown in FIGS. 2 and 3 installed in the coupling and with the gasket in a compressed configuration.

Referring now to FIGS. 2-4, a conventional prior art single piece elastomeric gasket 35 for use in the coupling 10 is illustrated. The gasket 35 may be of any compressible elastomeric material, selected in a known manner based upon the fluids, temperatures, pressures, and other parameters of the system in which the coupling 10 is to be used. The gasket 35 has a generally annular shape with a longitudinal axis 36. FIGS. 2 and 3 illustrate the gasket 35 in a relaxed configuration, which is the configuration of the gasket 35 when it is first installed in the annular groove 29 of coupling component 13 before the coupling component 12 is connected and locked to the coupling component 13. The gasket 35 in this relaxed configuration has a generally rectangular cross section or profile and is commonly referred to as a square cut gasket. The gasket 35 in this configuration includes radially inwardly facing and radially outwardly facing longitudinally extending peripheral surfaces 37 and 38. Longitudinally spaced and longitudinally oppositely facing generally flat lateral surfaces 39 and 40 extend radially between the peripheral surfaces 37 and 38.

When the gasket 35 is installed in the coupling component 13 and coupling component 12 is connected and locked to the coupling component 13, the cross section or profile of the gasket 35 is displaced to a maximum compressed or deformed configuration illustrated in FIG. 4. In this configuration, the sealing surface 18 of coupling component 12 compresses and deforms the gasket 35 against the sealing surface 30 of coupling component 13 to provide a fluid tight seal. The area of the gasket 35 that is compressed and deformed by the sealing surface 18 of coupling component 12 is the annular area of the gasket 35 between points 41 and 42 that is engaged by the sealing surface 18. The area of the gasket 35 that is compressed and deformed by the sealing surface 30 of coupling component 13 is the annular area of the gasket 35 between points 43 and 44 that is engaged by the sealing surface 30. The actual dimensions and configurations of the prior art gasket 35 and coupling 10 shown in FIGS. 1-4 are for purposes of example, and other dimensions and configurations may also be provided by the prior art.

Figure 5:
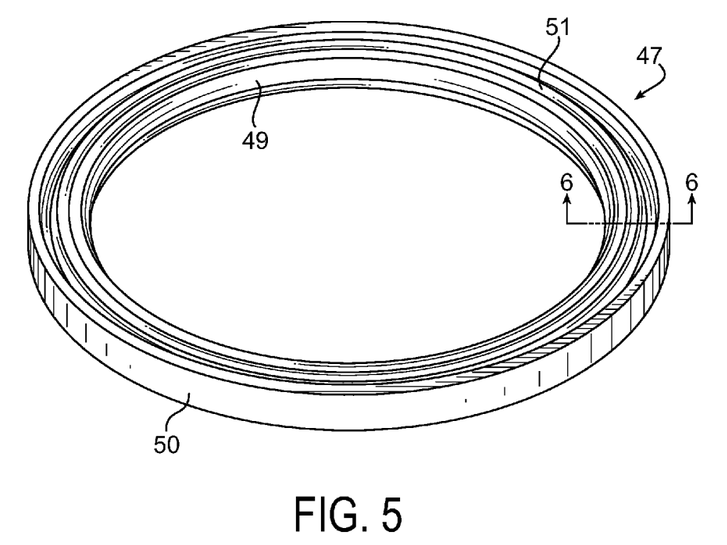
FIG. 5 is a perspective view of a first preferred embodiment of a gasket according to the present invention for use with the coupling shown in FIG. 1, with the gasket shown in a relaxed configuration.
Figure 6:
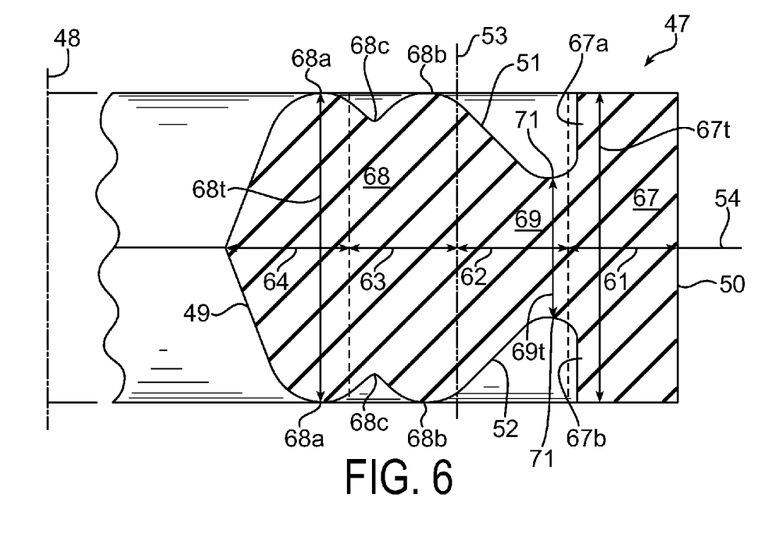
FIG. 6 is a cross sectional view of the gasket shown in FIG. 5, taken along reference view line 6-6.
Figure 7:
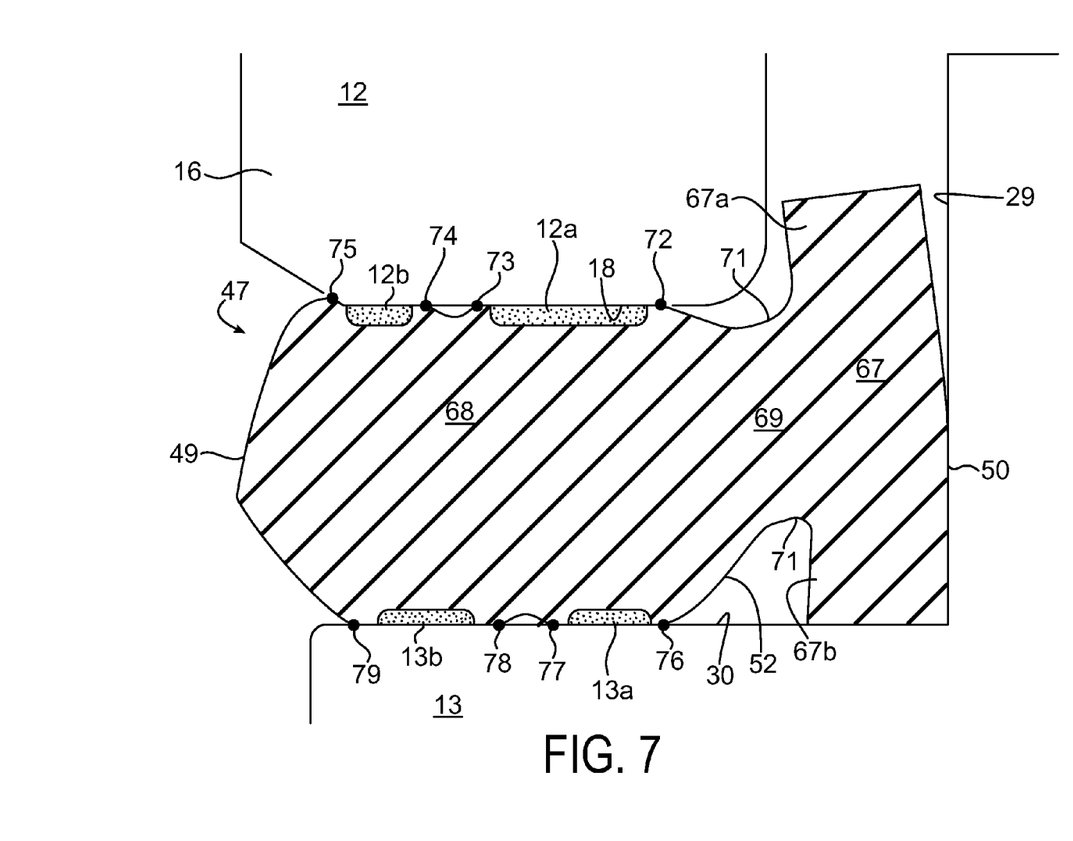
FIG. 7 is a cross sectional view of a portion of the cam lock quick coupling shown in FIG. 1, with the gasket shown in FIGS. 5 and 6 installed in the coupling and with the gasket in a compressed configuration.

Referring now to FIGS. 5-7, a first preferred embodiment of a single piece gasket 47 according to the present invention for use in the coupling 10 is illustrated. The gasket 47 is suitable for use with couplings over a full range of sizes from relatively smaller to relatively larger. The gasket 47 has a generally annular shape with a longitudinal axis 48. The gasket 47 may be of any compressible elastomeric material, selected in a known manner based upon the fluids, temperatures, pressures, and other parameters of the system in which the coupling 10 is to be used. In the preferred embodiment, the material for the gasket 47 is ethylene propylene diene monomer (EPDM). FIGS. 5 and 6 illustrate the gasket 47 in a relaxed configuration, which is the configuration of the gasket 47 when it is first installed in the annular groove 29 of coupling component 13 before the coupling component 12 is connected and locked to the coupling component 13 by the cam lever 26. The gasket 47 in this configuration includes radially inwardly facing and radially outwardly facing peripheral surfaces 49 and 50. Longitudinally spaced and oppositely facing lateral surfaces 51 and 52 of substantially mirror image profile extend radially between the peripheral surfaces 49 and 50. The gasket 47 in this relaxed configuration has an asymmetrical cross section or profile about its longitudinally extending profile centerline 53 and has a generally symmetrical cross section or profile about its laterally extending profile centerline 54. As discussed further below, this configuration enables the gasket 47 to be installed in the annular groove 29 of coupling component 13 with its lateral surfaces 51 and 52 facing in either direction to facilitate installation, while permitting asymmetrical compression of the gasket 47.

As best illustrated in FIG. 6, the lateral or radial extent of the gasket 47 has four quartile regions 61-64 of substantially equal radial extent. The first quartile region 61 is adjacent the outer peripheral surface 50, and the second quartile region 62 is adjacent the first quartile region 61. The third quartile region 63 is adjacent and radially inward relative to the second quartile region 62, and the fourth quartile region 64 is adjacent and radially inward relative to the third quartile region 63. The cross sectional profile of the gasket 47 includes a positioning portion 67, a compression sealing portion 68, and a connecting portion 69. The longitudinal extent or longitudinal thickness 69t of the connecting portion 69 is substantially less than and preferably no greater than about one half the longitudinal extent or longitudinal thickness 68t of the compression sealing portion 68. The connecting portion 69 provides a connection between the positioning portion 67 and the compression sealing portion 68 as further described below. The positioning portion 67 is located substantially adjacent the outer peripheral wall 50 and substantially in the radially outward quartile 61, and the positioning portion 67 is radially outward of the compression sealing portion 68 and connecting portion 69. The positioning portion 67 includes positioning tabs 67a and 67b, and the positioning portion 67 locates the gasket 47 relative to the groove 29. The compression sealing portion 68 is located substantially adjacent the inner peripheral wall 49 and substantially in the third and fourth quartile regions 63 and 64. The compression sealing portion 68 includes outwardly facing crests 68a and 68b separated by an outwardly facing valley or annular groove 68c, and the compression sealing portion 68 provides sealing contact with the sealing surfaces 18 and 30 of the coupling 10 as described further below. The connecting portion 69 is located substantially in the second quartile region 62, and the connecting portion 69 includes outwardly facing valleys or annular grooves 71.

When the gasket 47 is installed in the coupling 10 and the coupling component 12 is connected and locked to the coupling component 13, the cross section or profile of the gasket 47 is displaced to a maximum compressed or deformed configuration illustrated in FIG. 7. In this configuration, the sealing surface 18 of coupling component 12 moves relative to the sealing surface 30 to compress and deform the crests 68a and 68b. The sealing portion crests 68a and 68b of the first or top lateral surface 51 are displaced in the longitudinal direction relative to the positioning portion 67 and relative to the connecting portion 69 and relative to the sealing crests 68a and 68b of the second or bottom lateral surface 52. The connecting portion 69 accommodates this deformation of the gasket 47. In this compressed configuration, the deformed crests 68a and 68b of the top lateral surface 51 seal against the annular sealing surface 18 of coupling component 12, while the deformed crests 68a and 68b of the bottom or second lateral surface 52 seal against the sealing surface 30 of coupling component 13 to provide a fluid tight seal. The area of the first lateral surface 51 of the gasket 47 that is compressed and deformed by the sealing surface 18 of coupling component 12 is the sum of the annular area of the gasket 47 between points 72 and 73 plus the annular area of the gasket 47 between points 74 and 75. Similarly, the area of the second lateral surface 52 of the gasket 47 that is compressed and deformed by the sealing surface 30 of coupling component 13 is the sum of the annular area of the gasket 47 between points 76 and 77 plus the annular area of the gasket 47 between points 78 and 79. Based upon finite element analysis calculations, the region of maximum compression stress of the gasket 47 against the coupling component 12 occurs in the region indicated by reference number 12a and the region of maximum compression stress of the gasket 47 against the coupling component 13 occurs in the region indicated by reference number 13a. Because the longitudinal force that can be applied by the sealing surface 18 against the gasket 47 is limited by the connecting force that can be applied by the cam levers 26 against the cam surface 17, and because the compressed annular areas of the gasket 47 are substantially smaller than the compressed annular areas of the prior art gasket 35, the maximum compression stress of the gasket 47 against both the sealing surface 18 of coupling component 12 and the sealing surface 30 of coupling component 13 is substantially increased with the gasket 47. By increasing the gasket compression stress for a given connecting force exerted by the cam lever 26, sealing characteristics and particularly sealing characteristics with repeated connections and disconnections may be substantially enhanced by the gasket according to the present invention.

Figure 8:
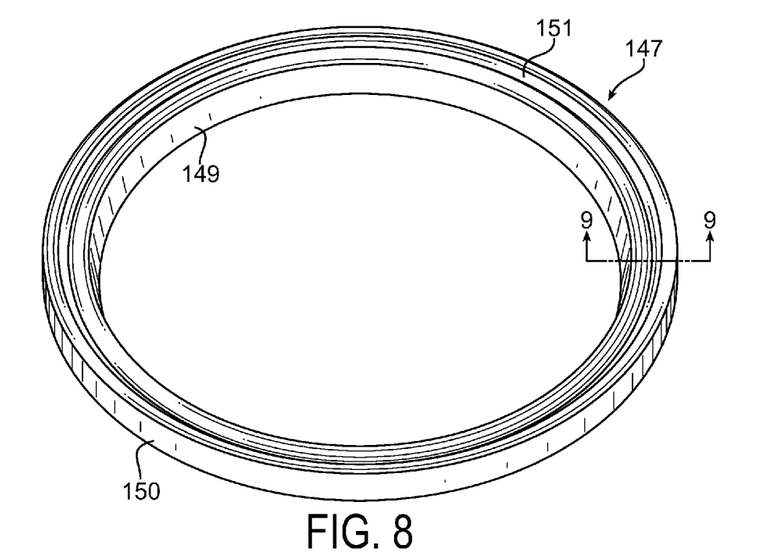
FIG. 8 is a perspective view of a first alternate preferred embodiment of a gasket according to the present invention for use with the coupling shown in FIG. 1, with the gasket shown in a relaxed configuration.
Figure 9:
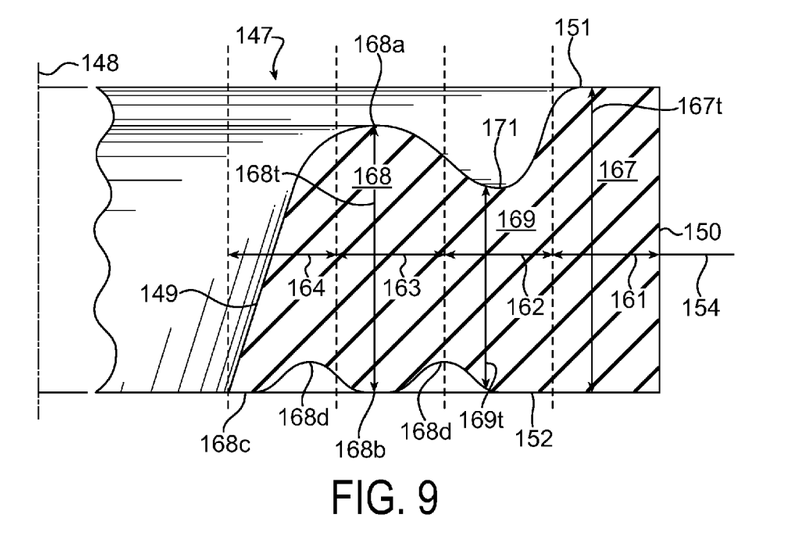
FIG. 9 is a cross sectional view of the gasket shown in FIG. 8, taken along reference view line 9-9.
Figure 10:
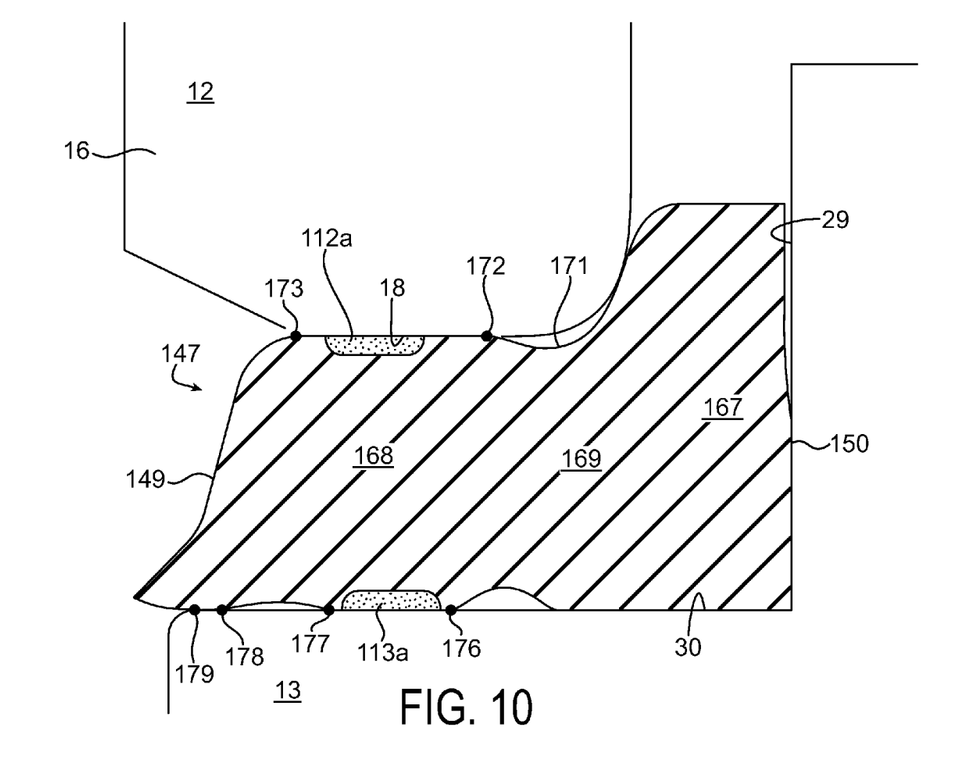
FIG. 10 is a cross sectional view of a portion of the cam lock quick coupling shown in FIG. 1, with the gasket shown in FIGS. 8 and 9 installed in the coupling and with the gasket in a compressed configuration.

Referring now to FIGS. 8-10, an alternate embodiment of a single piece gasket 147 according to the present invention for use in the coupling 10 is illustrated. The gasket 147 is more suitable for use with relatively smaller size couplings than with larger size couplings. The gasket 147 has a generally annular shape with a longitudinal axis 148 and a laterally extending profile centerline 154. The gasket 147 may be of any compressible elastomeric material, selected in a known manner based upon the fluids, temperatures, pressures, and other parameters of the system in which the coupling 10 is to be used. In the preferred embodiment, the material for the gasket 47 is ethylene propylene diene monomer (EPDM). FIGS. 8 and 9 illustrate the gasket 147 in a relaxed configuration, which is the configuration of the gasket 147 when it is first installed in the annular groove 29 of coupling component 13 before the coupling component 12 is connected and locked to the coupling component 13 by the cam lever 26. The gasket 147 in this configuration includes radially inwardly facing and radially outwardly facing peripheral surfaces 149 and 150. Longitudinally spaced and oppositely facing lateral surfaces 151 and 152 extend radially between the peripheral surfaces 149 and 150.

As best illustrated in FIG. 9, the lateral or radial extent of the gasket 147 has four quartile regions 161-164 of substantially equal radial extent. The first quartile region 161 is adjacent the outer peripheral surface 150, and the second quartile region 162 is adjacent the first quartile region 161. The third quartile region 163 is adjacent and radially inward relative to the second quartile region 162, and the fourth quartile region 164 is adjacent and radially inward relative to the third quartile region 163. The cross sectional profile of the gasket 147 includes a positioning portion 167, a compression sealing portion 168, and a connecting portion 169. The longitudinal extent or longitudinal thickness 169t of the connecting portion 169 is substantially less than the longitudinal extent or longitudinal thickness 168t of the compression sealing portion 168. The connecting portion 169 provides a connection between the positioning portion 167 and the compression sealing portion 168 as further described below. The positioning portion 167 is located substantially adjacent the outer peripheral wall 150 and substantially in the radially outward quartile 161, and the positioning portion 167 is radially outward of the compression sealing portion 168 and connecting portion 169. The positioning portion 167 locates the gasket 147 relative to the groove 29. The compression sealing portion 168 is located substantially adjacent the inner peripheral wall 149 and substantially in the third and fourth quartile regions 163 and 164. The first or top lateral surface 151 of the compression sealing portion 168 includes an outwardly facing crest 168a, and the compression sealing portion 168 provides sealing contact with the sealing surface 18 of the coupling 10 as described further below. The second or bottom lateral surface 152 of the compression sealing portion 168 includes outwardly facing crests 168b and 168c, and the compression sealing portions 168b and 168c provide sealing contact with the sealing surface 30 of the coupling 10 as described further below. The connecting portion 169 is located substantially in the second quartile region 162, and the connecting portion 169 includes an outwardly facing valley or annular groove 171.

When the gasket 147 is installed in the coupling 10 and the coupling component 12 is connected and locked to the coupling component 13, the cross section or profile of the gasket 147 is displaced to a maximum compressed or deformed configuration illustrated in FIG. 10. In this configuration, the sealing surface 18 of coupling component 12 moves relative to the sealing surface 30 to compress and deform the crest 168a. The sealing portion crest 168a of the first or top lateral surface 151 is displaced in the longitudinal direction relative to the positioning portion 167 and relative to the connecting portion 169 and relative to the sealing crests 168b and 168c of the second or bottom lateral surface 152. The connecting portion 169 accommodates this deformation of the gasket 147. In this compressed configuration, the deformed crest 168a of the top lateral surface 151 seals against the annular sealing surface 18 of coupling component 12, while the deformed crests 168b and 168c of the bottom or second lateral surface 152 seal against the sealing surface 30 of coupling component 13 to provide a fluid tight seal. The area of the first lateral surface 151 of the gasket 147 that is compressed and deformed by the sealing surface 18 of coupling component 12 is the annular area of the gasket 147 between points 172 and 173. Similarly, the area of the second lateral surface 152 of the gasket 147 that is compressed and deformed by the sealing surface 30 of coupling component 13 is the sum of the annular area of the gasket 147 between points 176 and 177 plus the annular area of the gasket 147 between points 178 and 179. Based upon finite element analysis calculations, the region of maximum compression stress of the gasket 147 against the coupling component 12 occurs in the region indicated by reference number 112a and the region of maximum compression stress of the gasket 147 against the coupling component 13 occurs in the region indicated by reference number 113a. Because the longitudinal force that can be applied by the sealing surface 18 against the gasket 147 is limited by the connecting force that can be applied by the cam levers 26 against the cam surface 17, and because the compressed annular areas of the gasket 47 are substantially smaller than the compressed annular areas of the prior art gasket 35, the maximum compression stress of the gasket 147 against both the sealing surface 18 of coupling component 12 and the sealing surface 30 of coupling component 13 is substantially increased with the gasket 147. As mentioned above in connection with gasket 47, by increasing the gasket compression stress for a given connecting force exerted by the cam lever 26, sealing characteristics and particularly sealing characteristics with repeated connections and disconnections may be substantially enhanced by the gasket according to the present invention.

Figure 11:
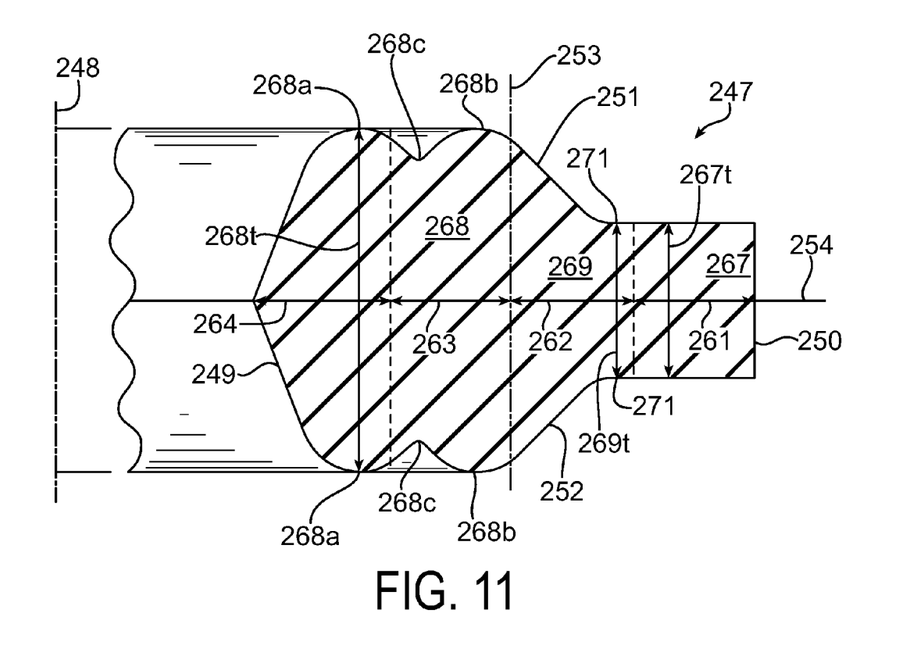
FIG. 11 is a cross sectional view, similar to FIG. 6, showing a second alternate preferred embodiment of a gasket according to the present invention for use with the coupling shown in FIG. 1, with the gasket shown in a relaxed configuration.

Referring now to FIG. 11, a second alternate embodiment of a single piece gasket 247 according to the present invention for use in the coupling 10 is illustrated. The gasket 247 illustrated in FIG. 11 is structurally and functionally substantially the same as the gasket 47 shown in FIGS. 5-7 and described above, with the exception that the tabs 67a and 67b of the gasket 47 are not used in the gasket 247. Elimination of the tabs 67a and 67b may facilitate installation of the gasket 247 into the coupling 10. The description above relating to the structure and operation of the gasket 47 of FIGS. 5-7 (including the description of the gasket 47 as installed in the coupling 10 in its relaxed configurations and fully compressed configurations, but excluding the description of the tabs 67a and 67b) also describes the gasket 247 of FIG. 11, with the reference numbers used in FIGS. 5-7 and its above description changed in FIG. 11 by adding a prefix "2."

Presently preferred embodiments of the invention are shown in the drawings and described in detail above. The invention is not, however, limited to these specific embodiments. Various changes and modifications can be made to this invention without departing from its teachings, and the scope of this invention is defined by the claims set out below. Also, while terms such as first and second, one and another, top and bottom are used to more clearly describe the structure and operation of the specific embodiments of the invention, it should be understood these terms are used for purposes of clarity and may be interchanged as appropriate. Further, separate components illustrated in the drawings may be combined into a single component, and single components may be provided as multiple parts.

What is claimed is:

1. A gasket for use with mating components, the gasket being of a compressible elastomeric material and having a generally annular shape with a longitudinal axis, a radially inwardly facing inner peripheral surface and a radially outwardly facing outer peripheral surface, longitudinally oppositely facing lateral surfaces, a positioning portion substantially adjacent the outer peripheral surface, a compression sealing portion substantially adjacent the inner peripheral surface, and a connecting portion intermediate the positioning portion and the compression sealing portion, the connecting portion having a longitudinal thickness substantially less than the longitudinal thickness of the compression sealing portion, wherein at least one of the lateral surfaces of the compression sealing portion includes two outwardly facing crests separated by an outwardly facing groove.

2. A gasket as set forth in claim 1, wherein the connecting portion is closer to the outer peripheral surface than to the inner peripheral surface.

3. A gasket as set forth in claim 1, wherein the lateral extent of the gasket has four quartile regions of substantially equal radial extent, the first quartile region is adjacent the outer peripheral surface, the second quartile region is adjacent and radially inward relative to the first quartile region, the third quartile region is adjacent and radially inward relative to the second quartile region, the fourth quartile region is adjacent and radially inward relative to the third quartile region, and the positioning portion is disposed substantially within the first quartile region.

4. A gasket as set forth in claim 3, wherein the sealing compression portion is disposed substantially within the third and fourth quartile regions.

5. A gasket as set forth in claim 3, wherein the connecting portion is disposed substantially within the second quartile region, and the longitudinal thickness of the connecting portion is substantially less than the longitudinal thickness of the compression sealing portion.

6. A gasket as set forth in claim 3, wherein the connecting portion is disposed substantially within the second quartile region, the longitudinal thickness of the connecting portion is substantially less than the longitudinal thickness of the compression sealing portion, the gasket has a relaxed configuration and a fully compressed configuration, the gasket has a laterally extending centerline in the relaxed configuration, and the first lateral surface of the compression sealing portion is closer to the lateral centerline in the compressed configuration than in the relaxed configuration.

7. A gasket as set forth in claim 1, wherein both of the lateral surfaces of the compression sealing portion include two outwardly facing crests separated by an outwardly facing groove.

8. A gasket as set forth in claim 7, wherein the entire lateral extent of the lateral surfaces are substantially mirror images of one another.

9. A gasket as set forth in claim 1, in combination with mating first and second cam lock quick coupling components, the first and second coupling components each have a generally flat coupling component sealing surface, and the coupling component sealing surfaces are longitudinally aligned with the gasket compression sealing portion.

\* \* \* \* \*